D. W. EAMES.
Car Truck.
No. 8,197.
Patented July 1, 1851
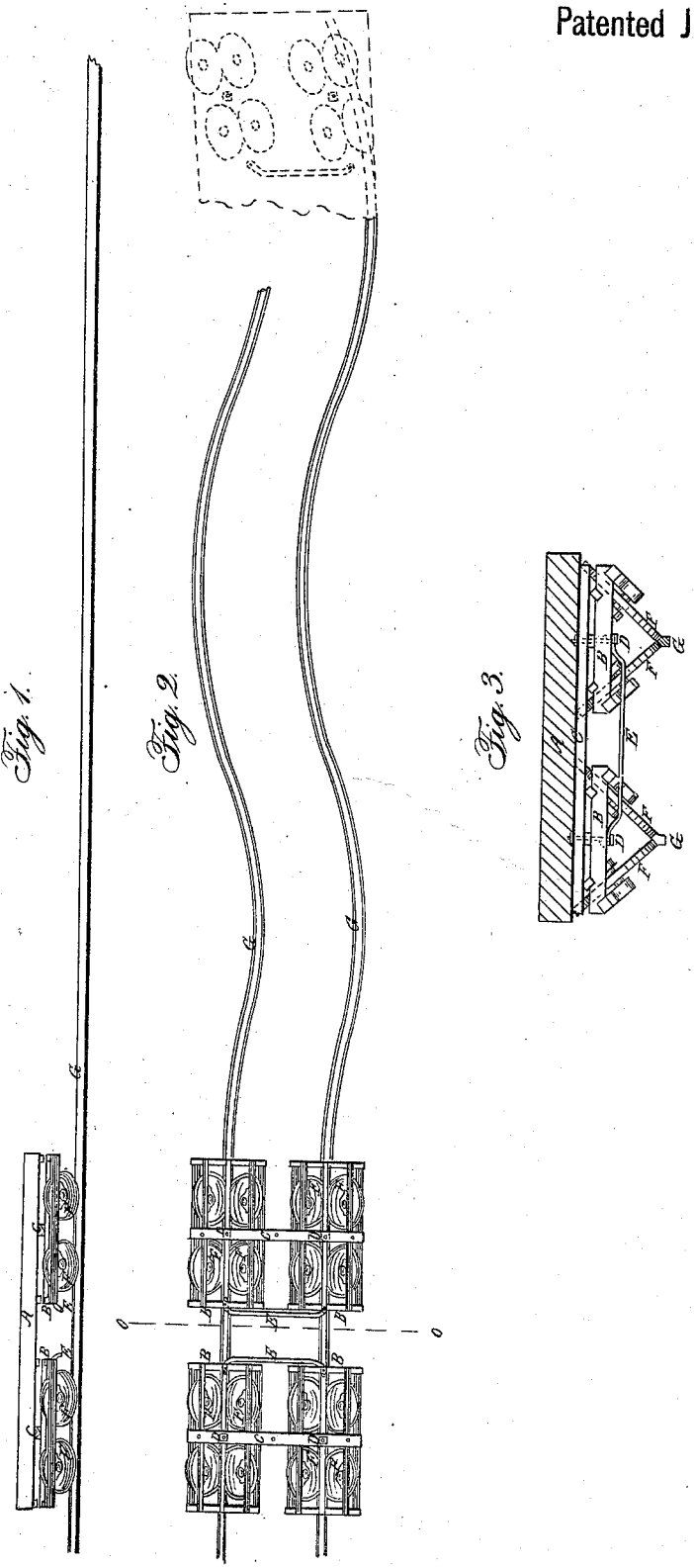

UNITED STATES PATENT OFFICE.

DANIEL W. EAMES, OF WEST TURIN, NEW YORK.

RUNNING-GEAR OF RAILROAD-CARRIAGES.

Specification of Letters Patent No. 8,197, dated July 1, 1851.

*To all whom it may concern:*

Be it known that I, DANIEL W. EAMES, of West Turin, in the county of Lewis and State of New York, have invented certain new and useful Improvements in Trucks or other Vehicles Traveling on or Over Railways; and I do hereby declare that the following is a full, clear, and exact description of the same, reference being had to the accompanying drawings, forming part of this specification, in which—

Figure 1, is a side elevation. Fig. 2, is a plan showing the truck represented in Fig. 1, with its platform removed, and also showing in broken diagram (seen in red) the truck traveling on one curved rail only. Fig. 3, is a transverse section of the truck taken through the line o, o, Fig. 2, and as positioned on straight rails shown also in cross section.

The same letters of reference denote similar parts in each of the several figures.

The nature of my invention consists in attaching to the trucks, or vehicles, any number of duplicate inclined wheels resting upon opposite sides of the same rail whereby the moving vehicles are in a manner tied to the rail so that curves may be more easily traveled, also not necessarily causing any deviation from the course by breakage or removal of one line of rail.

To enable others skilled in the art to make and use my invention I will proceed to describe its construction and operation.

A, is the platform of a vehicle.

B, B, B, B, are trucks secured to the cross pieces C, C, of the platform in pairs within the same transverse line by bolts D, D, D, D, on which they swivel, each pair of trucks being connected by tie rods E, E, that by being attached loosely through bolts a, a, a, a, at either end serve to keep the two trucks forming each pair parallel when moving on a curve or deviation from the straight line of rail.

F, F, F, F, F, F, F, F, are the running wheels having their bearings in boxes or projections secured to the trucks, these wheels, made with any suitable shaped peripheries, are positioned, in any number of pairs set at angles of 45° (more or less) to the horizon, the two wheels forming each pair converging toward one another as they approach the rail, on the opposite upper sides of which they rest or travel.

G, G, are the rails of a single track. They are shown with curved upper or running surfaces but any other suitable form of rail may be used.

The operation and further description is as follows: The running wheels set and positioned as described and as more clearly seen by reference to accompanying drawings, rest, (either pair) upon the upper surface of either rail so that the periphery of each wheel bears on either side, that is their points of contact with the rails are on opposite sides of a vertical line passing longitudinally through the rail by reason of the inclined position they are set in, so that the peripheries of the several wheels not only serve as bearing surfaces but also by their breadth act as, or have a similar effect to flanges, but affording greater protection than the ordinary side flanges, by the reduced tendency they have to creep up the rail and entailing a diminished amount of friction by reason not only of their surfaces of contact being less but of a rolling action being substituted for a rubbing one, also serving to tie the wheels traveling on either line of rail independent altogether of those moving upon the other line, so that, should a length of one line of rail be, by accident, displaced, the truck will be kept on its course as shown by diagram in red Fig. 2, the parallel motion given to the several pairs of trucks situated in the same transverse line, through the swiveling arrangements described and tie rods E, E, serving to retain the wheels of either rail at a proper distance from each other so as to cause the off wheels to mount the rail after moving over a displacement of one of the lengths, also facilitating the travel on curves, when moving over which the several parts will be operated upon in a similar manner to that represented by diagram in red Fig. 2. But if preferred, a single truck swiveling at the center and carrying the wheels for both rails, may be used, instead of the pair of trucks coupled by tie rods as described. Also where running on rails of T, or similar form, the wheels (any number of them) may be made with flanges on either their exterior, interior or both faces, causing the flanges, through the inclined position of the wheels, to lap under the projecting edges of the rails and so tie the truck as if it were to the rails, the which, the wheels, thus constructed, will not be able to leave, or to deviate from the track, without tearing up the rail or rails along with them.

My improvements also are equally applicable to locomotive engines, the driving wheels of which by being thus inclined would require to be operated in a somewhat different to the usual manner, but the mechanical arrangements for doing which, it is unnecessary to describe. The more prominent advantages however secured by my invention are as already referred to,—the increased security obtained in the travel of curves, and the prevention or non liability of the truck or vehicle being thrown from its course by the misplacement of one line of rail, which advantages the duplicate inclined wheels resting (either pair) upon opposite sides of the same rail, constituting the novelty of my invention, succeed in accomplishing; for, as is evident in the travel of curves, instead of where single wheels are used, the truck being guided in the direction of the curve through the action of the wheels upon one rail only, it will be governed or directed by the action of the wheels on both rails, or at least, presuming the gage to be uniform, such might be made its action, in order that quicker curves may be traveled with greater speed and safety than now is the case, and with reference to the freedom from accident by the displacement of one rail, as before adverted to and explained, also as seen by diagram in red Fig. 2, the adoption of duplicate wheels acting upon opposite sides of the same rail form the means whereby I propose to effect this security, that is, by making the wheels upon one line of rail totally independent, as regards guidance, of the wheels upon the other line, so that any accident occurring to displace one length or more of one line of rail, the truck will not fly off but be guided in its proper course by the duplicate wheels resting upon the opposite sides of the same rail forming the other line.

Having thus explained the general features of the several parts used in my invention and specifically the novelty and advantages possessed by my improvements, I will proceed to state that I do not claim exclusively the employment of inclined wheels either with or without flanges as such have already before been used. But

What I claim as my invention and desire to secure by Letters Patent is—

The employment of wheels in any number of pairs attached on either side to the truck or frame of railway vehicles and set at any inclination to the horizon converging to a point in or below the rail, so that both wheels of any one pair will rest, or travel on opposite sides of the upper surface of either one or the same rail, essentially as shown and described.

DANIEL W. EAMES.

Witnesses:
WM. R. WADSWORTH,
PETER MILLER.